United States Patent
Kinyon et al.

(10) Patent No.: US 8,378,706 B2
(45) Date of Patent: Feb. 19, 2013

(54) METHOD TO DICE BACK-CONTACT SOLAR CELLS

(75) Inventors: Zachary Kinyon, Walnut Creek, CA (US); Douglas H. Rose, San Jose, CA (US); Karen Elizabeth Wilson, Sunnyvale, CA (US)

(73) Assignee: SunPower Corporation, San Jose, CA (US)

( * ) Notice: Subject to any disclaimer, the term of this patent is extended or adjusted under 35 U.S.C. 154(b) by 344 days.

(21) Appl. No.: 12/848,539

(22) Filed: Aug. 2, 2010

(65) Prior Publication Data

US 2012/0025837 A1 Feb. 2, 2012

(51) Int. Cl.
*G01R 31/26* (2006.01)
*G01R 31/00* (2006.01)
*H01L 25/00* (2006.01)
*B23K 15/00* (2006.01)

(52) U.S. Cl. .............. 324/760.01; 324/501; 136/243; 219/121.18

(58) Field of Classification Search ............ 324/761.01, 324/501
See application file for complete search history.

(56) References Cited

U.S. PATENT DOCUMENTS

| | | | | |
|---|---|---|---|---|
| 6,020,555 | A * | 2/2000 | Garboushian et al. | 136/256 |
| 7,390,961 | B2 * | 6/2008 | Aschenbrenner et al. | 136/244 |
| 2003/0010378 | A1 * | 1/2003 | Yoda et al. | 136/251 |
| 2010/0178716 | A1 * | 7/2010 | Zapalac et al. | 438/4 |
| 2010/0210040 | A1 * | 8/2010 | Basol | 438/4 |
| 2010/0240153 | A1 * | 9/2010 | Tabe | 438/4 |

* cited by examiner

*Primary Examiner* — Jeff Natalini
(74) *Attorney, Agent, or Firm* — Okamoto & Benedicto LLP

(57) ABSTRACT

A method of processing of solar cells includes determining that a back-contact solar cell is defective. The back-contact solar cell includes a first plurality of interconnect pads at a first edge thereof, and a second plurality of interconnect pads at a second, opposed thereof, the first and second pluralities of interconnect pads having opposite operational charges. The back-contact solar cell is then diced to define at least first and second back-contact solar cell sections. The first back-contact solar cell section has at least two interconnect pads, of the plurality of interconnect pads, at respective opposed edges thereof.

15 Claims, 9 Drawing Sheets

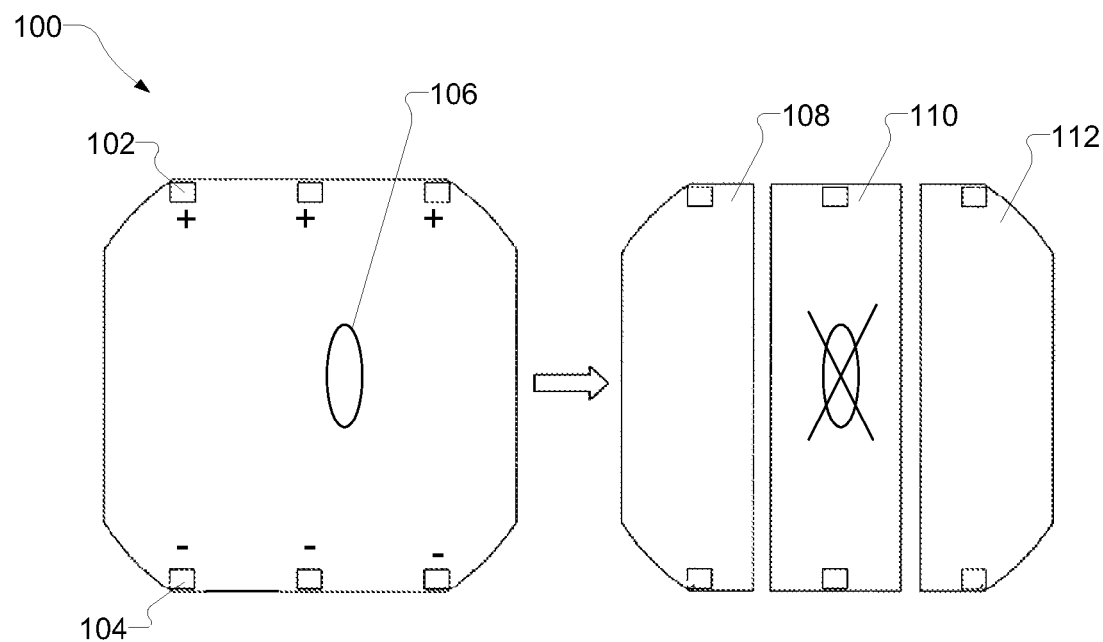
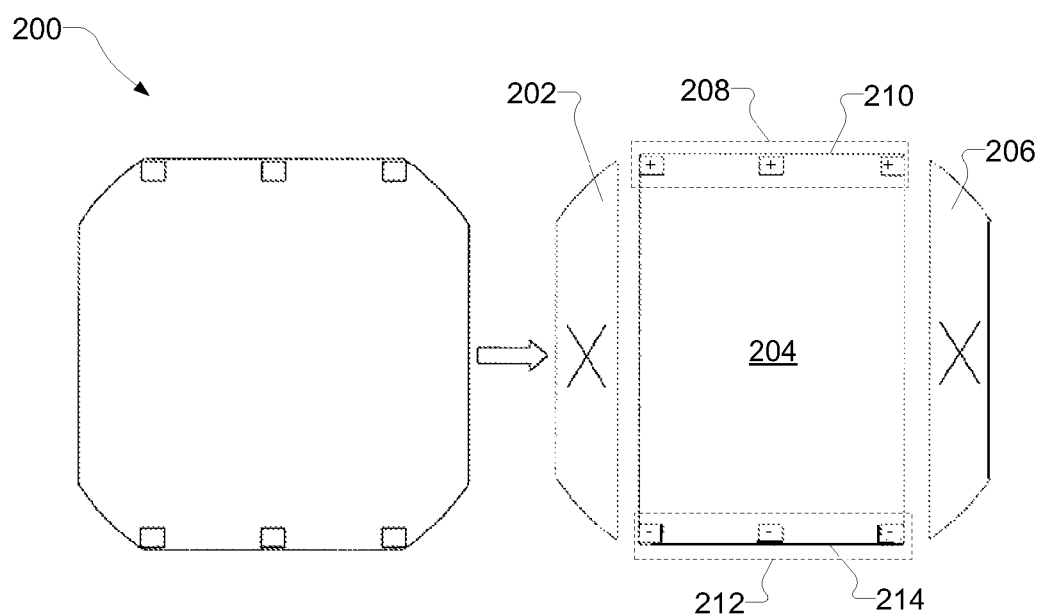
FIG. 1 (PRIOR ART)
FIG. 2

METHOD TO DICE BACK-CONTACT SOLAR CELLS

TECHNICAL FIELD

This disclosure pertains generally to solar cells, and more particularly, but not by way of limitation, to a method to dice back-contact solar cells.

BACKGROUND

Solar cells, and specifically photovoltaic (PV) cells, are widely used to convert solar radiation into electrical energy. Solar cells can be fabricated on a semiconductor wafer, using semiconductor processing technology. For example, a solar cell can be fabricated by forming p-doped and n-doped regions on a silicon substrate. Solar radiation impinging on the solar cell creates electrons and holes that migrate to the p-doped and n-doped regions, thereby creating voltage differences between the doped regions.

Certain crystalline-silicon PV cells can be based on back-contact (or rear-contact) design, which seeks to minimize front-side metallization and to maximize working cell area. In such back-contact solar cells, the doped regions are coupled to conductive leads or pads on the backside of the solar cell to allow external electrical circuits to be coupled and powered by the solar cell.

Several solar cells can be connected together to form a solar cell array. In a solar cell array, a conductive area (e.g., a positive solder pad) coupled to p-doped region of one solar cell can be connected to a conductive area (e.g., a negative solder pad) coupled to an n-doped region of an adjacent solar cell. The p-doped region of one solar cell is thus connected to an n-doped area of an adjacent solar cell. Chaining of solar cells can be repeated to connect several solar cells in series, thereby to increase the output voltage of the solar cell arrays. One method of connecting back-contact solar cells is described in U.S. Pat. No. 7,390,961 to Aschenbrenner, et al. (the '691 patent). The '691 patent describes a solar cell module having solar cells interconnected as a solar cell array. An interconnect assembly electrically connects the backsides of two adjacent solar cells. The interconnect assembly has an interconnect that electrically connects a contact point on a backside of a solar cell to a contact point on a backside of another solar cell. The interconnect assembly can further include an interconnect shield placed between the solar cells and the interconnect.

Considering individual solar cells, defects in such solar cells are typically localized, such that solar cells can be diced and the defective portion of the solar cell discarded. FIG. 1 is a diagram illustrating a prior art method by which solar cells can be diced into equal thirds, and a defective portion discarded. Specifically a solar cell 100, having a series of positive solder pads 102 disposed adjacent a first edge, and a series of negative electrical polarity contacts in the form of solder pads 104 disposed adjacent an opposite edge, includes a defective location 106. By dicing the solar cell 100 into thirds (e.g., sections 108, 110 and 112), up to two thirds of the solar cell can be "re-harvested" or recovered. This is possible, in the shown example, because each of the sections 108 and 112, which excludes the defective location 106, has respective positive and negative solder pads disposed adjacent opposed ends thereof. Accordingly, these sections 108 and 112 can be connected in series.

While the dicing method shown in FIG. 1 facilitates re-harvesting of a certain portion of a solar cell, the reliability of a solar array in which the cell sections 108 and 112 are used can be negatively impacted by the loss of redundancy in the solder pad interconnections. For example, if a solder joint between connected positive and negative solder pads of sections 108 and 112 were to fail as an open circuit, the performance of the solar array drops significantly because a bypass diode may need to be activated, and the string in which the sections 108 and 112 are deployed will no longer contribute to the total power production of the relevant solar array. Additionally, if a solder joint fails as a high-resistance connection, there exists a potential for a resistive heating or arcing scenario.

BRIEF DESCRIPTION OF DRAWINGS

Some embodiments are illustrated by way of example and not limitation in the figures of the accompanying drawings in which:

FIG. 1 is a plan view of a solar cell, illustrating a prior art method of dicing the solar cell.

FIG. 2 is a plan view of a solar cell, illustrating a method, according to one example embodiment, of dicing a solar cell.

DETAILED DESCRIPTION

Figure 3A:
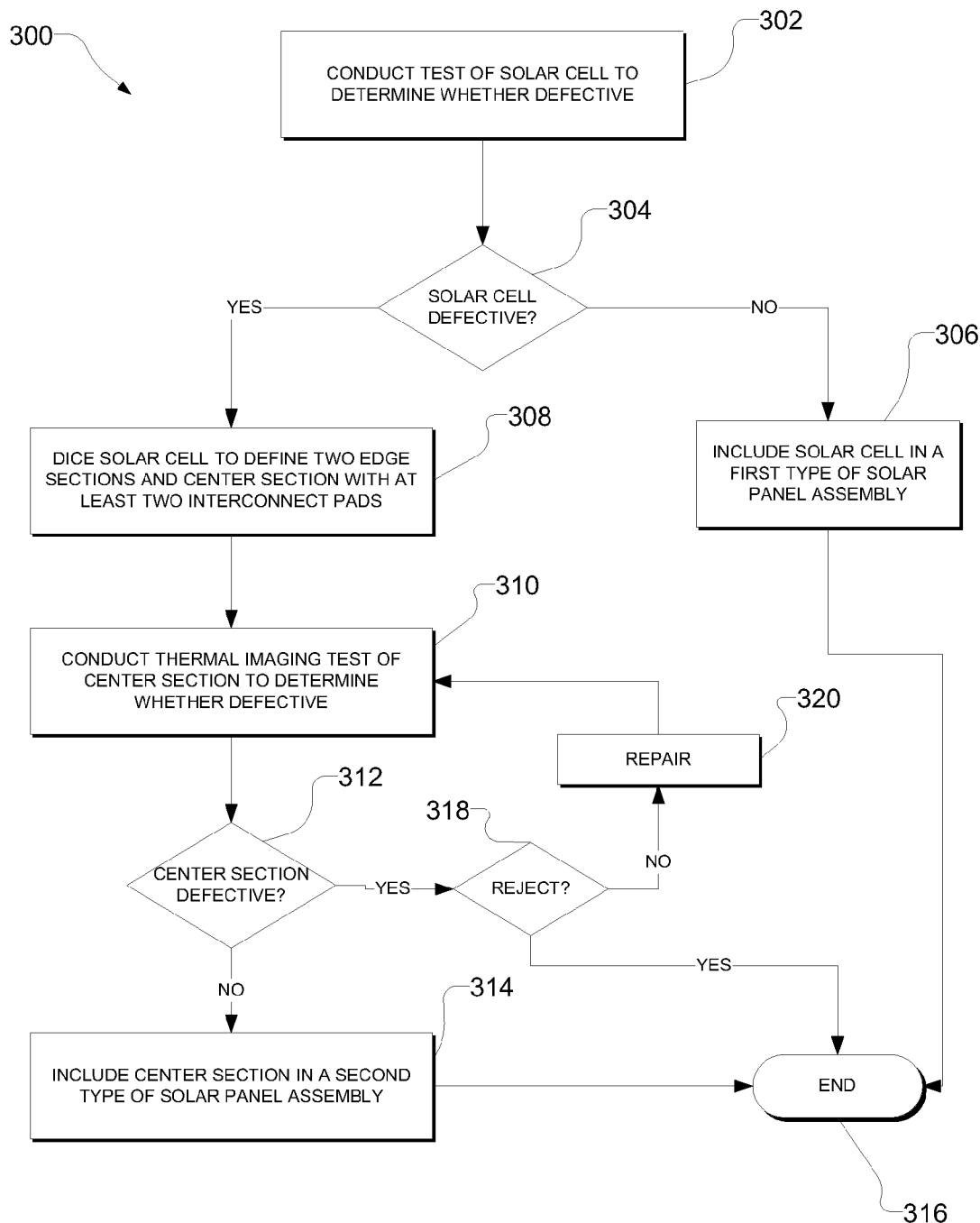
FIGS. 3A and 3B are flow charts illustrating methods, according to some example embodiments, of processing solar cells.

In the following description, for purposes of explanation, numerous specific details are set forth in order to provide a thorough understanding of some example embodiments. It will be evident, however, to one skilled in the art that the present invention can be practiced without these specific details.

According to one example embodiment, there is provided a method of processing defective (or possibly defective) solar cells to provide a reliable solar cell section that can be harvested from defective cells. FIG. 2 is a plan view of a solar cell, illustrating a technique, according to one example embodiment, of dicing a solar cell. In one example embodiment, shown in FIG. 2, edge sections 202 and 206 are diced off a solar cell 100, to create a solar cell section 204 having at least a pair of opposite-charge solder pads adjacent opposite edges of the solar cell section 204. For example, the solar cell section 204 has a first set of positive-charge solder pads 208 located adjacent a first edge 210, and a second set of negative-charge solder pads 212 located adjacent a second, opposed edge 214.

It will be appreciated that when solar cell sections, such as the solar cell section 204, are interconnected in series in a string, there is redundancy in the solder pad interconnection should a solder joint fail (e.g., as an open or high-resistant solder joint). A further description regarding interconnects is provided below with respect to FIGS. 7 and 8.

Defects in solar cells, such as the solar cell 200, have been found to be largely confined to right and left edges of solar cells. Accordingly, some example embodiments of solar cell processing methods discussed herein assume for solar cells found to be defective. The inventors have discovered that such defects are frequently located at or near the edges of such solar cells. Other example methods can include systematically locating and mapping defects on a solar cell with a view to performing the described dicing operations to specifically remove portions of the cell known to be defective.

FIG. 3A is a flowchart illustrating a method 300, according to some example embodiments, to process a solar cell. The method 300 commences at operation 302 where a testing device conducts a test with respect to a back-contact solar cell to determine whether the solar cell is defective. A solar cell can be defective as a result of any number of defects, such as intrinsic defects, structural defects, impurities, or any combination of these defect types. Accordingly, a testing device is one that can be used to detect any of these defects, including the detection of multiple defect types in a single test. In one example embodiment, the testing device can be a thermal imaging tester (e.g., a short-wave infrared (SWIR) tester) to conduct a thermal imaging test to detect a failure of a subject back-contact solar cell. In another example embodiment, the testing device is an efficiency tester which operationally measures the conversion efficiency (e.g., solar radiation to electrical energy conversion efficiency) of the subject back-contact solar cell. Electron beam-induced current (EBIC) can be used to detect electronic irregularities, such as shunts and precipitates, in solar cells and to perform physical characterization of defects by, for example, measuring the temperature dependence of their recombination activity. Luminescence methods such as electroluminescence (EL) and photoluminescence (PL) can also provide useful information on defects in solar cells.

Figure 4:
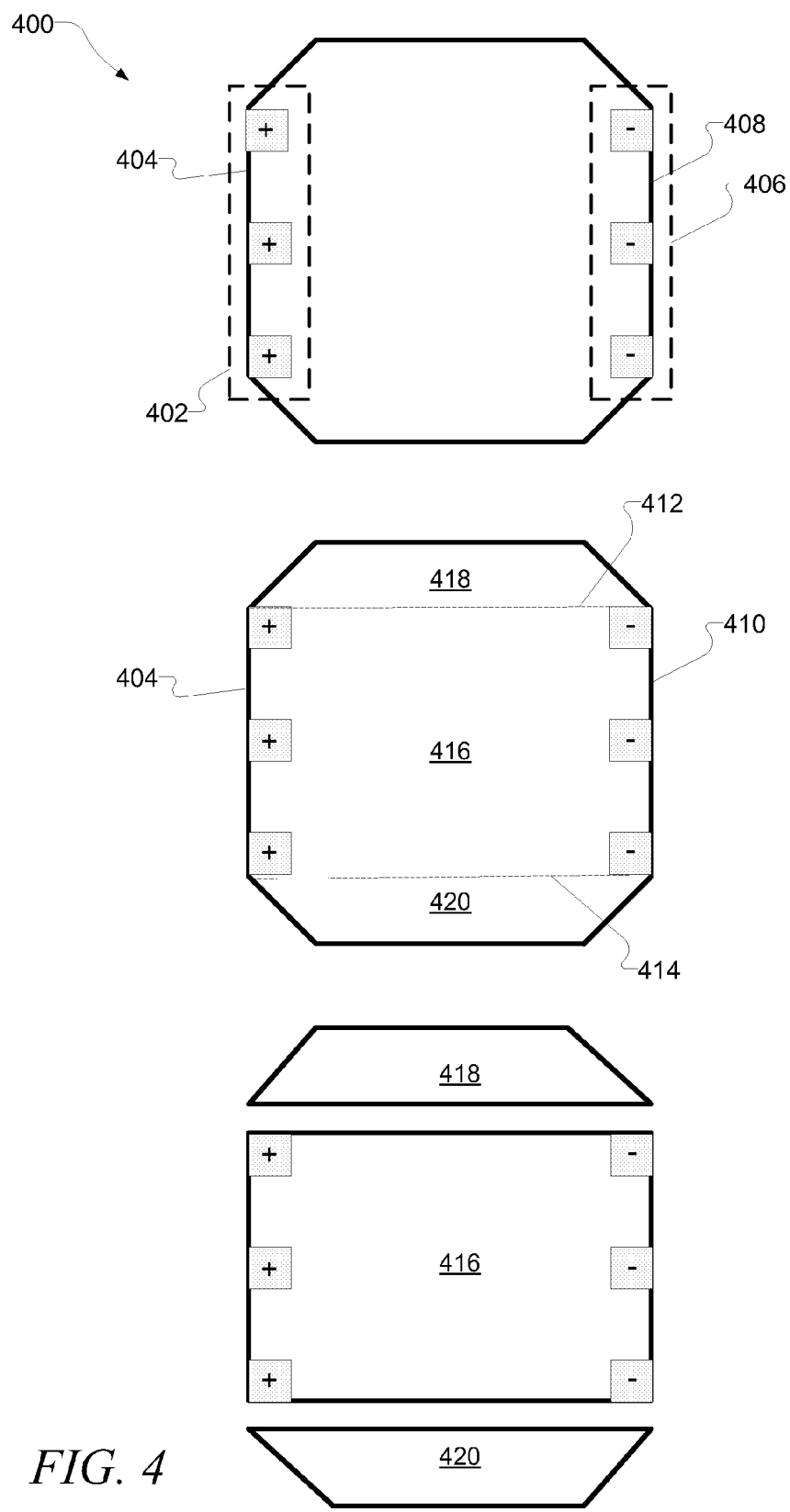
FIG. 4 is a plan view of a solar cell, illustrating operations of a method of dicing a solar cell, according to an example embodiment.

FIG. 4 illustrates an example back-contact solar cell 400, on which a defect test can be conducted at operation 302. The solar cell 400 is shown to include a first set 402 of positive-charge interconnect pads at a first edge 404 of the solar cell, and a second set 406 of negative-charge interconnect pads at a second, opposed edge 408 of the solar cell. For the purposes of the present description, when an interconnect pad (or contact) is described as being "at" an edge of a solar cell, it does not require that the interconnect pads be directly abutting the edge. An interconnect pad that is at an edge of a solar cell can also be adjacent, near, or proximate to the relevant edge of the solar cell.

Returning to FIG. 3A, at operation 304, a determination is made as to whether the subject solar cell is defective. For example, the results of a thermal imaging test, conducted at operation 302, can be assessed to identify any "hotspots" on the solar cell 400. Similarly, where the test conducted at operation 302 is an efficiency test, the efficiency of the solar cell 402 can be assessed in order to determine whether the solar cell is defective.

If the subject solar cell is found to be not defective at operation 304, the method 300 progresses to operation 306, where the non-defective solar cell is assembled into a first type of solar panel assembly. In an example embodiment, this solar panel assembly uses solar cells of a first set of dimensions and/or shape (e.g., the shape of the solar cell 400). The assembly of the solar cell into a solar panel assembly can include connecting multiple solar cells in series in a string of solar cells. Such strings can then be connected, in series and/or in parallel, with other strings to create an array of solar cells for a solar panel assembly.

On the other hand, should the subject solar cell be determined at operation 304 to be defective, the method 300 progresses to operation 308. At operation 308, the solar cell is diced, using a suitably configured dicing apparatus, to define at least two solar cell sections (e.g., first and second back-contact solar cell sections). At least one of the two solar cell sections has two or more interconnect pads (of the original set of interconnect pads of the solar cell) at respective of opposed edges of the solar cell section. In one example embodiment, the subject solar cell is diced, as shown in FIG. 4, by forming or defining two dice lines 412 and 414 that extend transversely across the solar cell 400, between the opposed edges 404 and 410, to define a center solar cell section 416 there between, such that at least two interconnect pads of each of the sets 402 and 406 are present at each of the opposed edges of the central section 416. The dice lines 412 and 414 also define two edge sections 418 and 420 which, as shown in FIG. 4, can then be separated from the center section 416 as part of the dicing operation 308.

The dicing apparatus that is used to forming the dice lines 412 and 414 can be at least one of a laser, water jet or mechanical saw. The dicing can include a "scribe and break" process, whereby the scribe lines are defined across the solar cell 400, where after the edge sections 418 and 420 are broken off from the center section 416.

In one example embodiment, the scribing of dice lines and breaking can be through the negative electrically-charged regions (n-doped regions) in a solar cell with an n-type substrate in order to minimize the effect of unpassivated edge surfaces.

Figure 5:
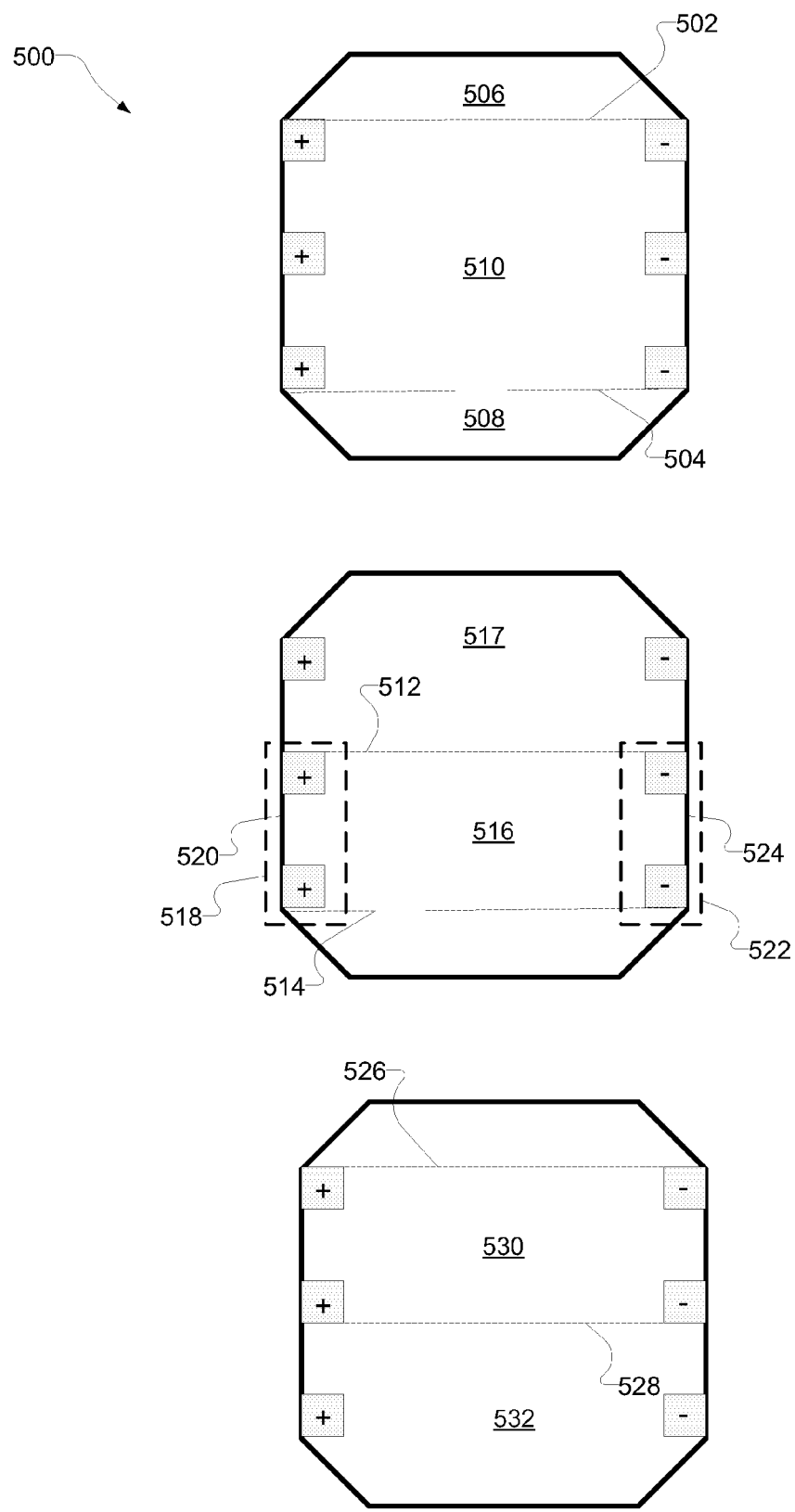
FIG. 5 is a plan view of a solar cell, illustrating patterns to dice a solar cell, according to different example embodiments.

FIG. 5 is a plan view of a back-contact solar cell, showing three example embodiments of dicing operations that can be performed with respect to the solar cell. In a first example embodiment, dice lines 502 and 504 define edge sections 506 and 508, and a center section 510. The center section 510 has a set of three interconnect pads at each edge thereof, each of the sets of interconnect pads having an operationally opposite charge.

In a second example embodiment, dice lines 512 and 514 define a center section 516, having a first set 518 of positive-charge interconnect pads at a first edge of the center section, and a second set 522 of negative-charge interconnect pads at a second, opposed edge 524 of the center section 516.

Similarly, in a third example embodiment, dice lines 526 and 528 define a center section 530 that has sets of operational opposite-charge interconnect pads located at opposed edges of the center section 530. In other example embodiments, only a single dice line (e.g., any one of dice lines 502, 504, or 528) can be defined during dicing operations in order to allow separation of one of the edges of the sections 506, 508, 517, or 532. For example, if section 506 includes a defective location, then a single dice line 502 can be defined during dicing operation to allow section 506 to separate from sections 508 and 510. In another example, if section 517 includes a defective location, then a single dice line 512 can be defined during dicing operation to allow section 517 to separate from section 516. In yet another example, if section 532 includes a defective location, then a single dice line 528 can be defined during dicing operation to allow section 530 to separate from section 532.

Following the dicing operations performed at operation 308 with respect to a subject solar cell, in one example embodiment, the method 300 can progress directly to operation 314. In operation 314, a center section (e.g., center section 510, 516 or 530) can be included in a second type of solar panel assembly. In one example embodiment, construction of the second type of solar panel assembly can include creating a string of center sections of uniform shape and configuration (but different from the shape and configuration of solar cells included in the assemblies at operation 306) that is assembled into a module, which module is in turn included within a solar array.

In one example embodiment, center sections 510, having three interconnect pads located at each of opposed edges, can be interconnected as a string of solar cells. In a further example embodiment, center sections 516 or 530, having a set of two interconnect pads at each of opposed edges, can be interconnected as a string of solar cells.

Returning to operation 308, in a further example embodiment, the method 300 can progress from operation 308 to operation 310, where additional testing (e.g., thermal image or efficiency testing) can be conducted with respect to a salvaged center section (510, 516 or 530) to determine whether the relevant center section, 510, 516 or 530 is defective.

Following a determination that the relevant center section is not defective at operation 312, the method 300 progresses to operation 314. At operation 314, a center section (e.g., center section 510, 516 or 530) can be included in a second type of solar panel assembly. In one example embodiment, construction of the second type of solar panel assembly can include creating a string of center sections of uniform shape and configuration (but different from the shape and configuration of solar cells included in the assemblies at operation 306) that is assembled into a module, which module is in turn included within a solar array.

In one example embodiment, center sections 510, having three interconnect pads located at each of opposed edges, can be interconnected as a string of solar cells. In a further example embodiment, center sections 516 or 530, having a set of two interconnect pads at each of opposed edges, can be interconnected as a string of solar cells.

Should the center section be determined to be defective at operation 312, the method 300 can progress to decision operation 318, where an assessment is made as to whether the center section can be repaired or otherwise salvaged. If not, the method 300 then ends at operation 316. Alternatively, the center section can be repaired at operation 320, and then subject to further testing at operation 310.

In one example embodiment, following the dicing operations performed at operation 308 with respect to a subject solar cell, the method 300 can progress directly to operation 314, where a center section (e.g., center section 510, 516 or 530) can be included in the second type of solar panel assembly.

Figure 3B:
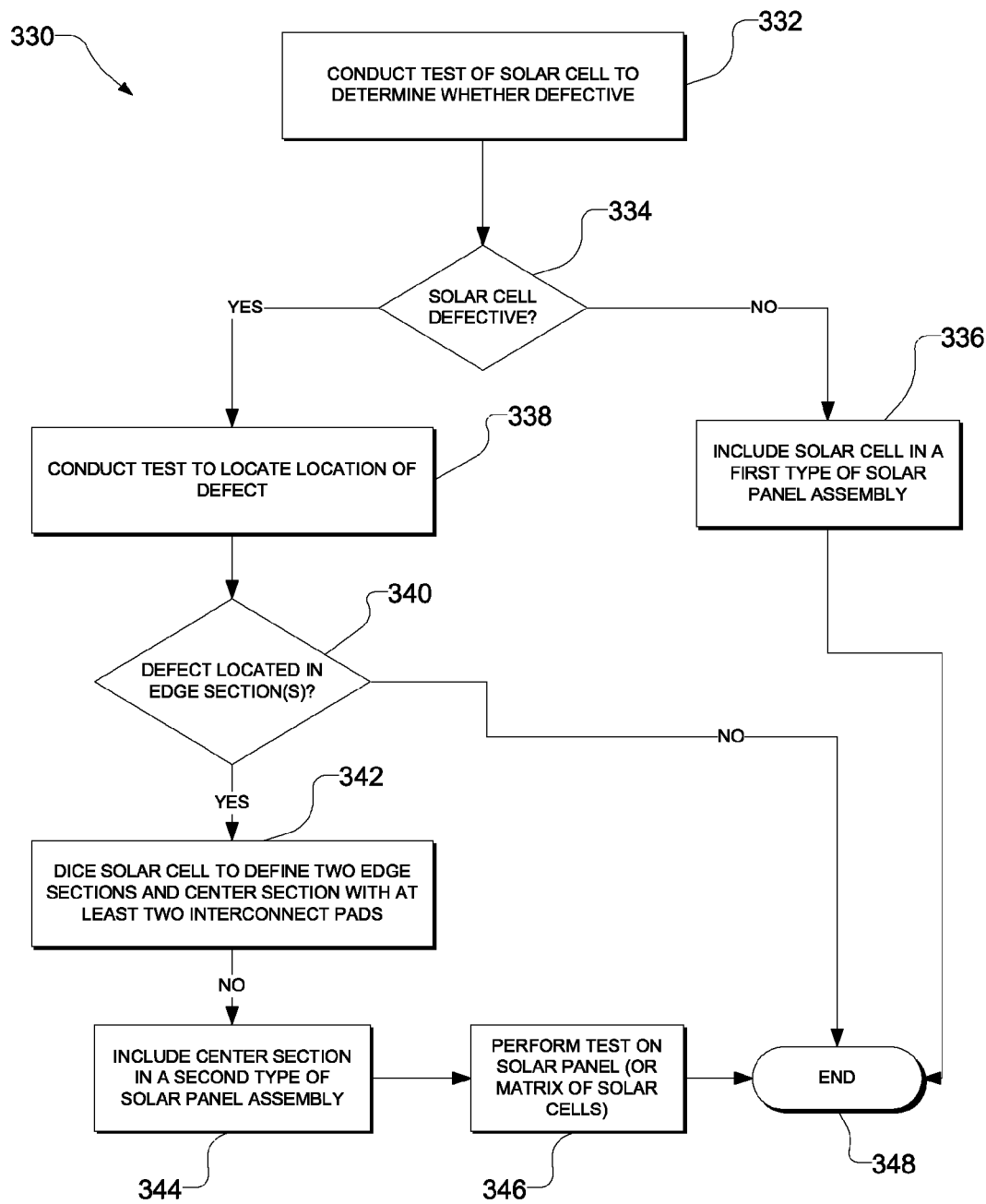

FIG. 3B is a flowchart illustrating a method 330, according to further example embodiments, to process a solar cell. The method 330 commences at operation 332 where a testing device, configured to determine whether a solar cell is defective, conducts a test with respect to a back-contact solar cell to determine whether the solar cell is defective.

At operation 334, a determination is made as to whether the subject solar cell is defective. If the subject solar cell found to be not defective at operation 334, the method 330 progresses to operation 336, where the non-defective solar cell is assembled into a first type of solar panel assembly.

On the other hand, should the subject solar cell be determined, at operation 334, to be defective, the method 330 progresses to operation 338. At operation 338, a test is conducted to determine the location of the defect. In one example embodiment, the operations 332 and 338 can be combined into a single operation, where the solar cell is determined to be defective and the location of a defect is determined as a continuous and single operation. At operation 340, a determination is made as to whether the defect (or more than one defect if multiple defects are detected) are located in edge sections of the solar cell. If not (i.e., the one or more defects are located in the center section of the solar cell), the method 330 and proceeds directly to termination at operation 348

On the other hand, should the one or more defects of the solar cell be determined to be to be located in the major sections, the method 330 progresses to operation 342. At operation 342, the solar cell is diced, using a suitably configured dicing apparatus, to define at least two solar cell sections (e.g., first and second back-contact solar cell sections). At least one of the two solar cell sections has two or more interconnect pads (of the original set of interconnect pads of the solar cell) at respective of opposed edges of the solar cell section.

At operation 344, a center section (e.g., center section 510, 516 or 530) can be included in a second type of solar panel assembly. In one example embodiment, construction of the second type of solar panel assembly can include creating a string of center sections of uniform shape and configuration (but different from the shape and configuration of solar cells included in the assemblies at operation 336) that is assembled into a module, which module is in turn included within a solar array.

At operation 346, one or more tests can be performed on the solar panel, or matrixes of solar cells included with the solar panel, to assess whether the panel as a whole (or a particular matrix of the panel) is operational. The method 330 then terminates at operation 348.

Figure 6:
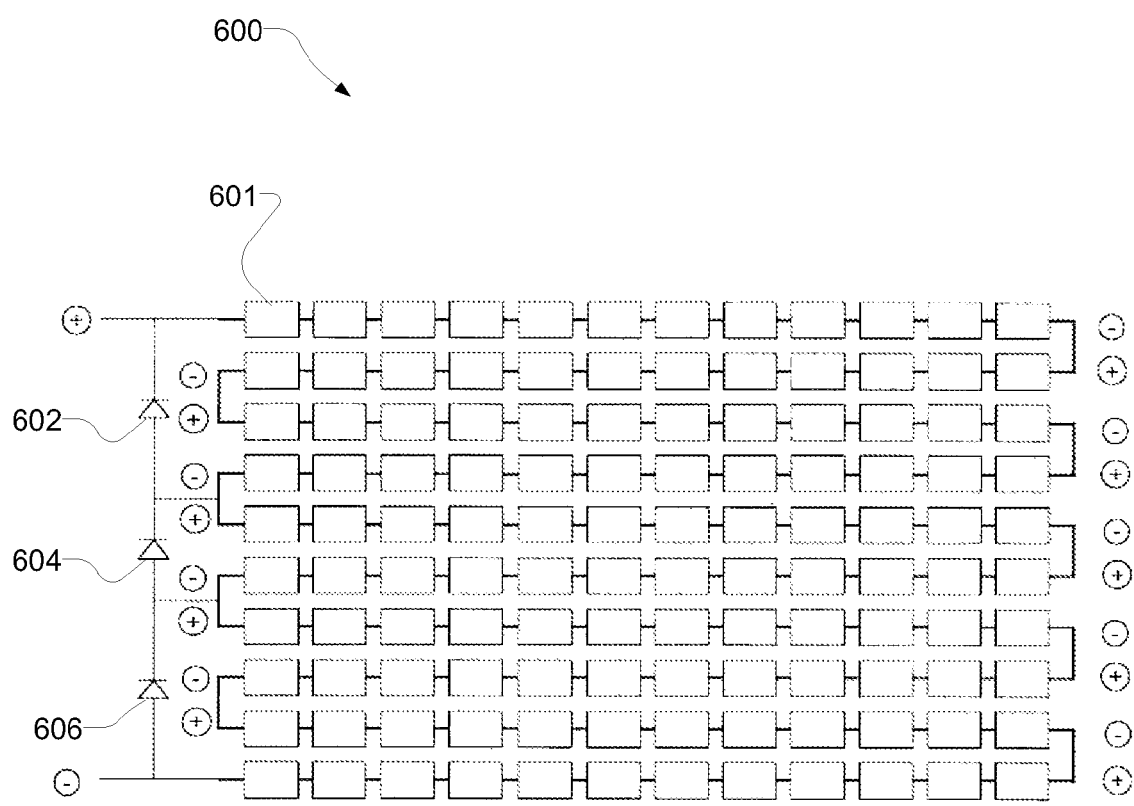
FIG. 6 is a plan view of a solar cell array which can be constructed from solar cell sections resulting from a cell dicing method, according to some example embodiments.
Figure 7:
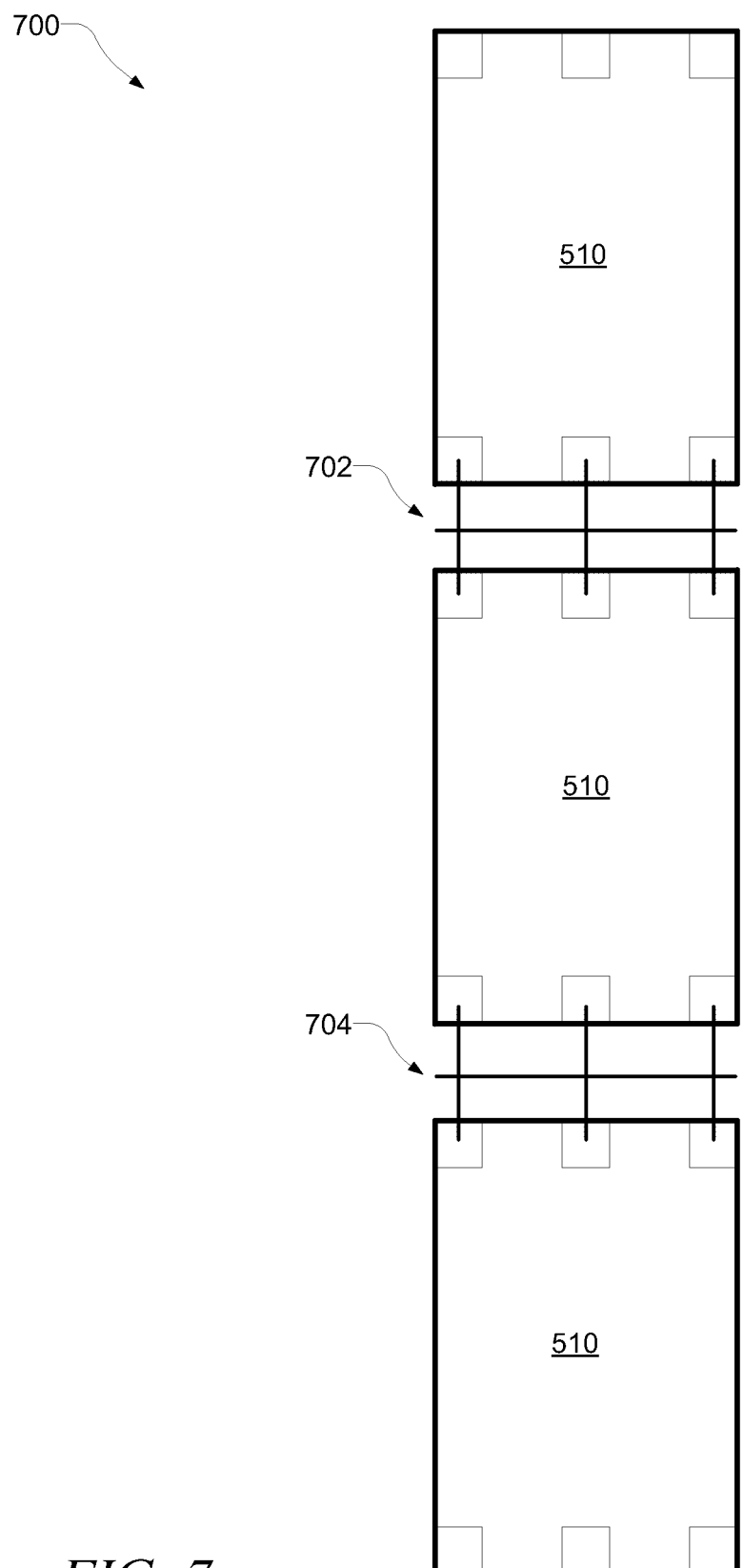
FIG. 7 is a plan view of a solar cell string, which can be incorporated into a solar cell array, constructed using solar cell sections that are interconnected using bus interconnects, according to a first example embodiment.

FIG. 6 is a plan view of a cell string arrangement 600, according to an example embodiment, whereby sections 601 of diced back-contact solar cells can be connected in series. Bypass diodes 602, 604, 606 are connected in parallel to interconnects between cells in a specific string section. It will be appreciated that, because each of the center cell sections 601 have a set of at least two interconnect pads at each of the interconnect edges thereof, a certain degree of redundancy is provided in the event that a solder joint fails. Referring to FIGS. 6 and 7, where center sections 510 are connected in series as a string, a triple redundancy with respect to solder joint failures is provided by the interconnect buses 704 and 702 interconnecting the cell sections 510.

Figure 8:
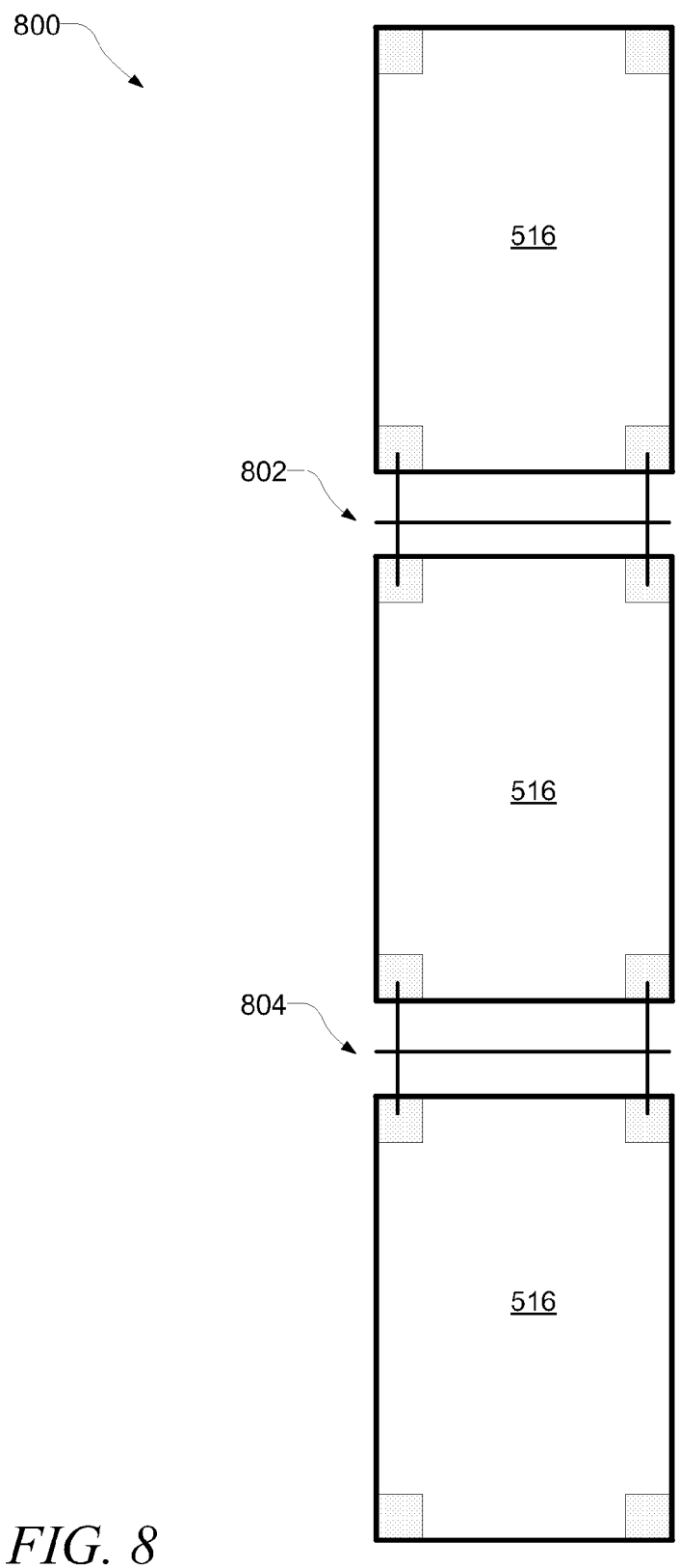
FIG. 8 is a plan view of a solar cell string, which can be incorporated into a solar cell array, constructed of solar cell sections that are interconnected using bus interconnects, according to a second example embodiment.

FIG. 8 shows a string arrangement of cell center sections 516, where the set of two interconnect pads at each of the opposed edges of a center section are connected to respective interconnect buses 802 and 804, and again provide a degree of redundancy should a solder joint with respect to the interconnect pads fail.

Returning to FIG. 3, with respect to operations 306 and 314, in addition to interconnecting center sections harvested from solar cells, for example, as described above with reference to FIGS. 7 and 8, string of interconnected solar cells sections can be secured within a solar panel assembly as modules of the solar panel assembly.

Figure 9:
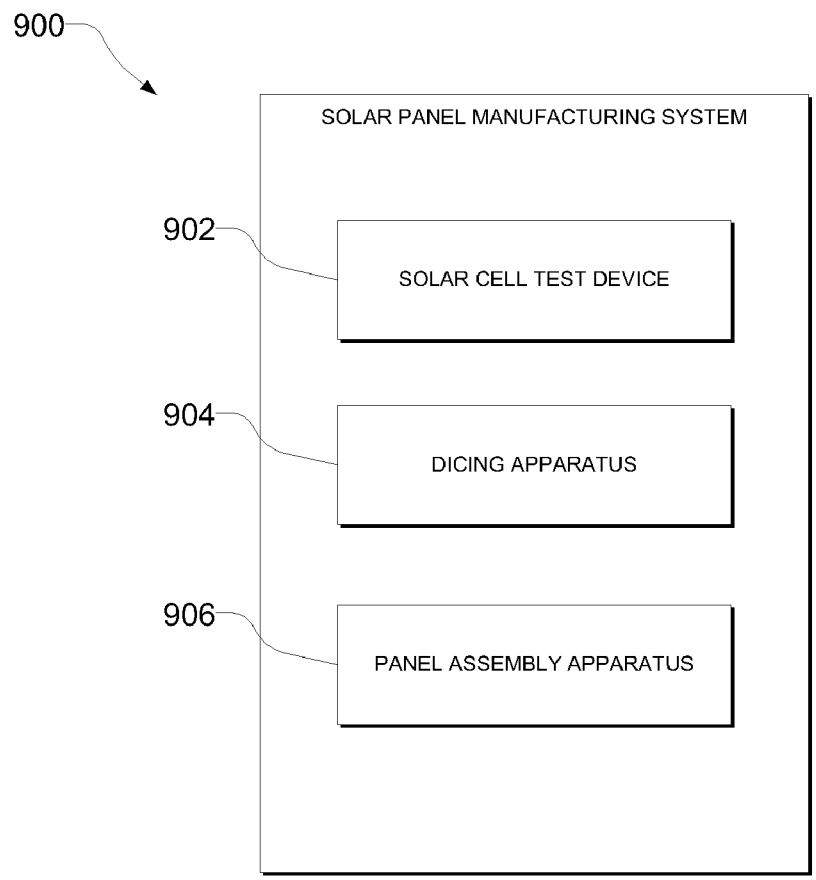
FIG. 9 is a block diagram illustrating a system, according to an example embodiment, to process solar cells.

FIG. 9 is a diagrammatic representation of a solar panel manufacturing system 900, according to an example embodiment. The system 900 includes a solar cell test device 902 that operationally determines whether a subject back-contact solar cell is defective. The system 900 further includes a dicing apparatus 904 to perform one or more of the dicing operations described above and a panel assembly apparatus 906 to be utilized in the assembly of the solar panel assemblies, as described above.

The above described methodologies can, in various example embodiments, be applied with respect to solar cells formed using crystalline silicon (e.g., monocrystalline silicon (c-Si), poly- or multicrystalline silicon (poly-Si or mc-Si), or ribbon silicon).

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   determining that a back-contact solar cell is defective, the back-contact solar cell having a first plurality of interconnect pads at a first edge and a second plurality of interconnect pads at a second edge, the first and second pluralities of interconnect pads having opposite operational charges; and
   dicing the back-contact solar cell to define first and second back-contact solar cell sections, the first back-contact solar cell section having at least two interconnect pads, of the plurality of interconnect pads, at each of first and second opposed edges thereof, wherein the dicing comprises forming at least two dice lines that extend transversely across the back-contact solar cell, between the opposed edges, to define the first back-contact solar cell section there between, such that the at least two interconnect pads are present at each of a pair of opposed edges of the first back-contact solar cell section.

2. The method of claim 1, wherein the determining of the back-contact solar cell as being defective comprises performing a thermal imaging test to detect a failure of the back-contact solar cell.

3. The method of claim 1, wherein the determining of the back-contact solar cell as being defective comprises performing an efficiency test to detect conversion efficiency of the back-contact solar cell.

4. The method of claim 3, wherein the performing of the efficiency test to detect conversion efficiency of the back-contact solar cell comprises performing a luminescence test.

5. The method of claim 3, wherein the performing of the efficiency test to detect conversion efficiency of the back-contact solar cell comprises performing an electroluminescence test.

6. The method of claim 3, wherein the performing of the efficiency test to detect conversion efficiency of the back-contact solar cell comprises performing a photoluminescence test.

7. The method of claim 1, wherein the forming of the at least two dice lines is performed using at least one of a laser, a water jet, and a mechanical saw.

8. The method of claim 1, including determining that the first back-contact solar cell section is non-defective, and including the first back-contact solar cell section in a solar panel assembly based on the determination.

9. The method of claim 1, further comprising:
   interconnecting the at least two interconnect pads of the first back-contact solar cell section to at least two further interconnect pads of a further back-contact solar cell section; and
   securing the first back-contact solar cell section and the further back-contact solar cell section in a solar panel assembly.

10. A system comprising:
    a testing device configured to determine that a back-contact solar cell is defective, the back-contact solar cell having a plurality of interconnect pads at each edge of a pair opposed edges of a back-contact solar cell; and
    dicing apparatus configured to divide the back-contact solar cell into at least first and second back-contact solar cell sections, the first back-contact solar cell section having at least two interconnect pads of the plurality of interconnect pads at each edge of a pair of opposed edges of the first back-contact solar cell section, wherein the dicing apparatus is configured to form at least two dice lines that extend transversely across the back-contact solar cell, between the opposed edges, to define the first back-contact solar cell section there between, such that the at least two interconnect pads are present on the first back-contact solar cell section.

11. The system of claim 10, wherein the testing device is a thermal imaging tester configured to detect a failure of the back-contact solar cell.

12. The system of claim 10, wherein the dicing apparatus is at least one of a laser, a water jet, and a mechanical saw.

13. The system of claim 10, wherein the testing device is configured to determine that the first back-contact solar cell section is non-defective.

14. A method comprising:
    determining that a back-contact solar cell is defective, the back-contact solar cell having a first plurality of interconnect pads at a first edge and a second plurality of interconnect pads at a second edge, the first and second pluralities of interconnect pads having opposite operational charges; and
    dicing the back-contact solar cell to define first and second back-contact solar cell sections, the first back-contact solar cell section having at least two interconnect pads, of the plurality of interconnect pads, at each of first and second opposed edges thereof, wherein the back-contact solar cell has three interconnect pads at each edge of the opposed edges, and wherein the dicing comprises dicing the back-contact solar cell to define first, second and third sections, the second and third sections comprising edge sections, and the first back-contact solar cell section having the three interconnect pads at each of the first and the second opposed edges thereof.

15. A system comprising:
a testing device configured to determine that a back-contact solar cell is defective, the back-contact solar cell having a plurality of interconnect pads at each edge of a pair opposed edges of a back-contact solar cell; and
dicing apparatus configured to divide the back-contact solar cell into at least first and second back-contact solar cell sections, the first back-contact solar cell section having at least two interconnect pads of the plurality of interconnect pads at each edge of a pair of opposed edges of the first back-contact solar cell section, wherein the back-contact solar cell has three interconnect pads at each edge of the opposed edges, and wherein the dicing apparatus is configured to dice the back-contact solar cell to define first, second and third sections, the second and third sections comprising edge sections, and the first section having the three interconnect pads at each edge of the opposed edges thereof.

* * * * *